March 22, 1927.
C. H. TAYLOR ET AL
1,622,241
AIRPLANE
Original Filed Jan. 21, 1918    3 Sheets-Sheet 1
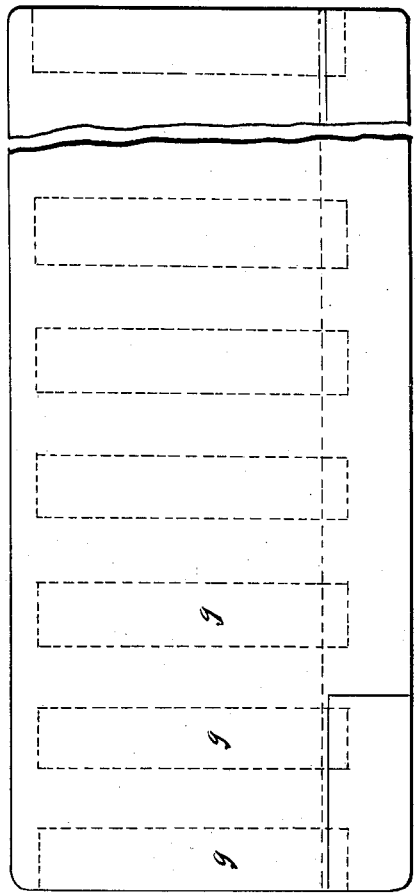
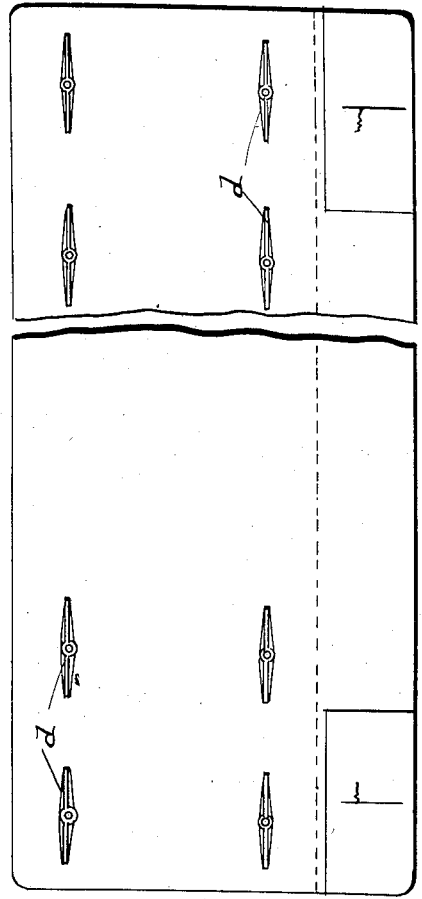
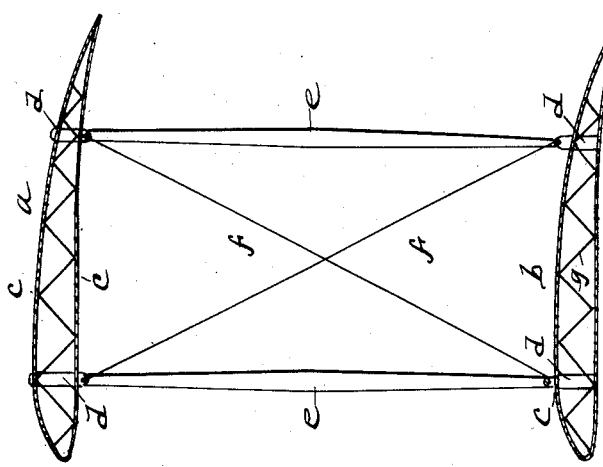
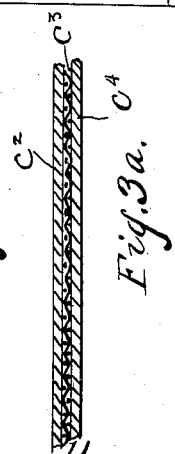
Inventors
CECIL HAMELIN TAYLOR.
BOUDEWIJN B. NEUTEBOOM
By Rahemond A. Parker
Attorney

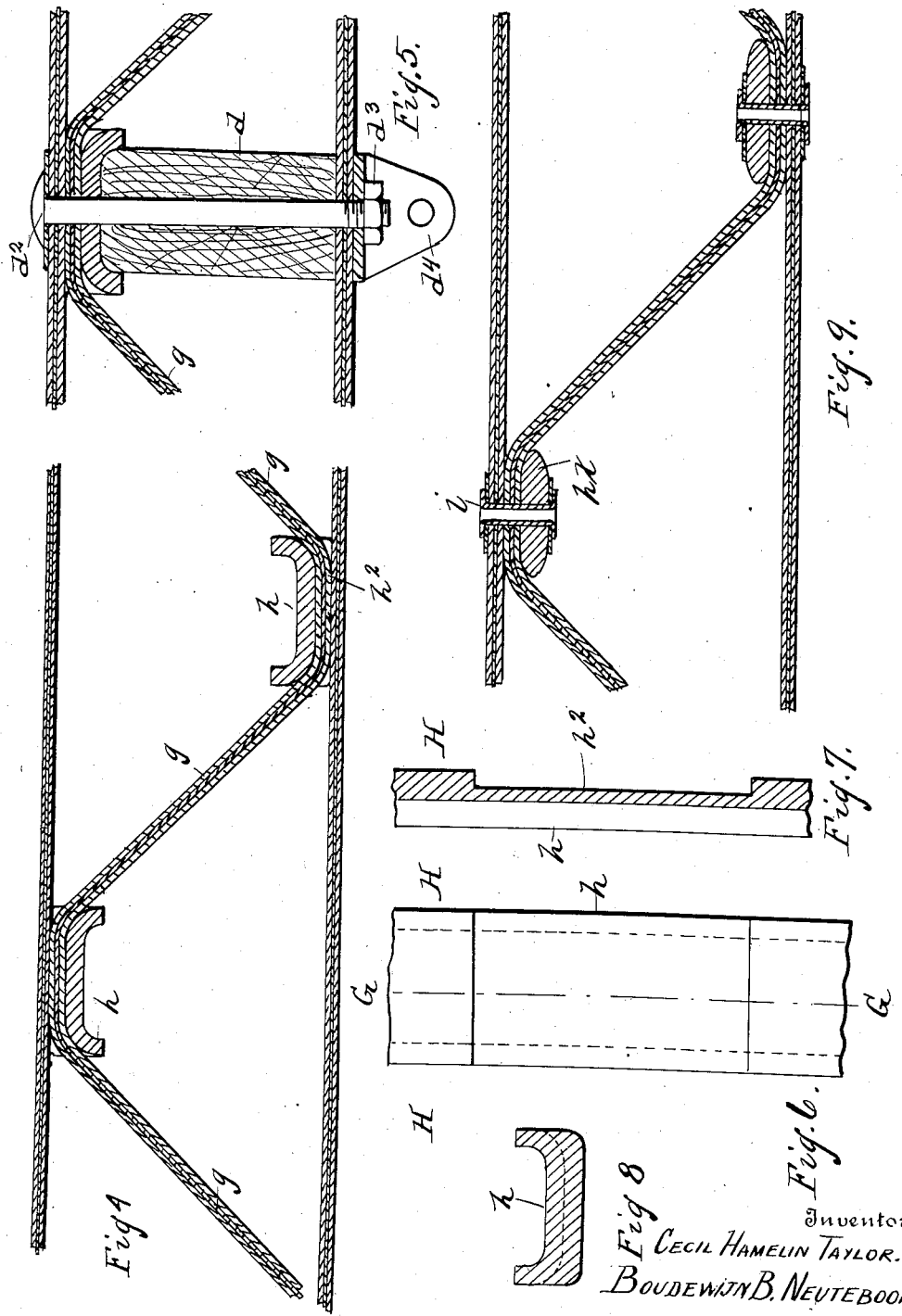

March 22, 1927.
C. H. TAYLOR ET AL
1,622,241
AIRPLANE
Original Filed Jan. 21, 1918 3 Sheets-Sheet 3
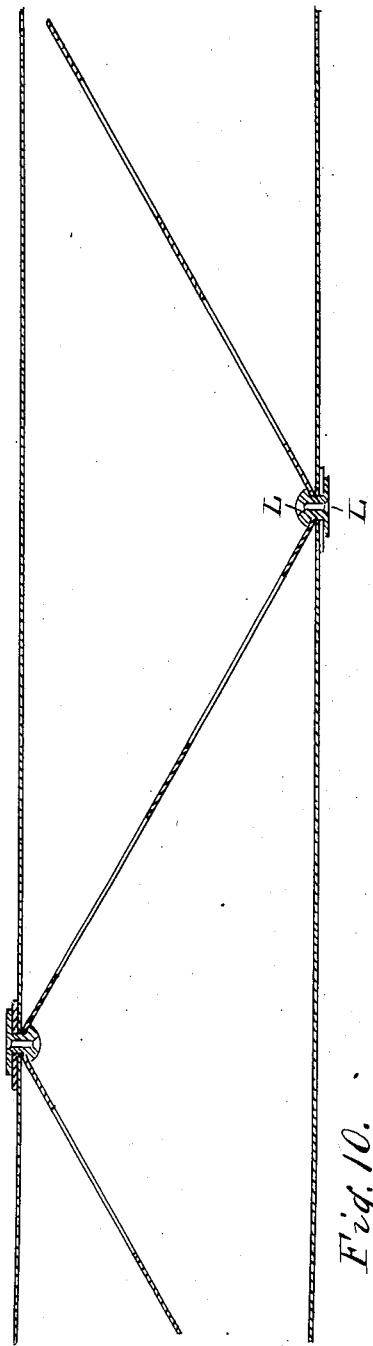
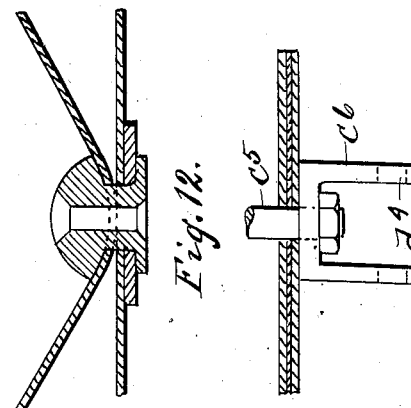
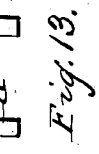
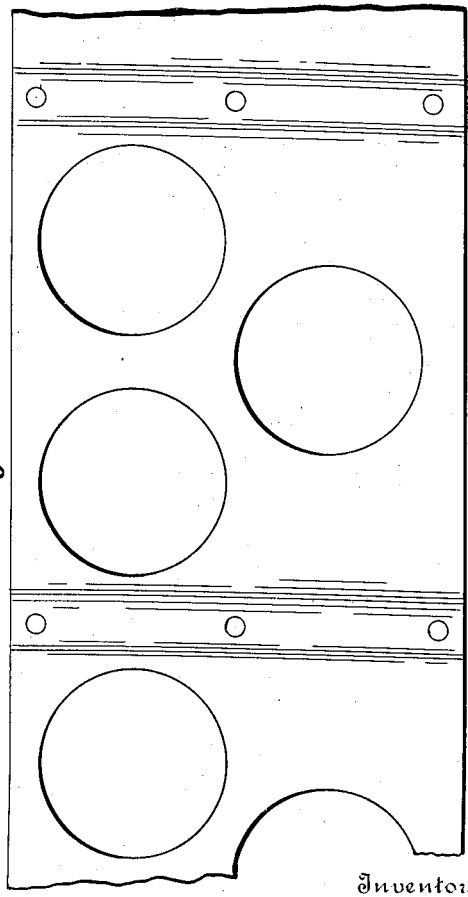
Inventors
CECIL HAMELIN TAYLOR.
BOUDEWIJN B. NEUTEBOOM.
By Ralzemond A. Parker
Attorney Patented Mar. 22, 1927.

1,622,241

UNITED STATES PATENT OFFICE.

CECIL HAMELIN TAYLOR AND BOUDEWIJN B. NEUTEBOOM, OF DETROIT, MICHIGAN.

AIRPLANE.

Application filed January 21, 1918. Serial No. 212,885. Renewed February 1, 1922. Serial No. 533,396.

Our invention relates to airplanes and an object of our improvements is to provide an improved construction for the wings thereof. We secure this object in the device illustrated in the accompanying drawing in which:

Figure 1 is a sectional view of an airplane embodying our invention.

Figure 2 is a plan view illustrating one form of construction of the wing.

Figure 3 is a view similar to Fig. 2 indicating a slightly different construction.

Figure 3$^a$ is a detail section of the covering material.

Figure 4 is a detail section of a portion of the wing.

Figure 5 is a view similar to Fig. 4, the section being taken adjacent to the point of connection of the struts and ties.

Figure 6 is a detail inverted plan view of a portion of one of the longitudinal ribs.

Figure 7 is a section on the line G—G Fig. 6.

Figure 8 is a section on the line H—H Figs. 6 and 7.

Figure 9 is a section similar to Fig. 4 but showing a slightly modified construction.

Figure 10 is a view similar to Fig. 4 showing the construction when sheet metal is used.

Figure 11 is a plan view of one of the bracing strips showing the method of lightening the same.

Figure 12 is a detail section on the line L—L Fig. 10.

Figure 13 is a section similar to Fig. 12 showing the construction at the point at which the ties and struts are attached.

Referring to Fig. 1, $a$ is the upper and $b$ is the lower wing. These wings are made of a light thin covering material $c$ formed into a conventional shape, one shape being shown in Fig. 1. The upper and lower decks, made of this covering material, are spaced apart at the points at which it is desired to fasten the struts and ties by blocks $d$ which are bound between the decks by a bolt $d^2$ (Fig. 5) which may have a clip $d^3$ at its inner end having attaching ears $d^4$. $e\ e$ are the struts secured to the clips $d^3$ and $f\ f$ are the ties also secured to said clips.

The covering material $c$, as indicated most distinctly in Fig. 3$^a$, is composed of an intermediate textile linen or textile sheet $c^3$ and a sheet of wood veneer $c^2$ and $c^4$ upon each side of it. The textile material is impregnated with glue and the veneers are pressed on each side of it and the whole is secured together by the glue.

$g$ indicates strips of the material of which the covering of the planes consists, which strips are bent to the form indicated in Figs. 1, 4 and 9 so as to form a series of diagonal braces between the decks of the planes. $h$ are strengthening strips preferably of wood and shaped to the forms shown in cross section. These strips are secured to the inner surface of the decks and extend longitudinally of the plane and are cut away at the points adjacent to the strips $g$, as indicated in Figs. 6 and 7, so as to permit the passage of said strips between the decks and said longitudinal strips and to form a tight and compact union at this point. These parts may all be secured together by glue.

Instead of having separate strips $g$ as indicated by dotted lines in Fig. 2 there may be a single broad sheet shaped in cross section as described, as indicated in Fig. 3.

Instead of the upturned edges of the longitudinal strips $h$ as shown in Fig. 4 the longitudinal strips may have the form shown in Fig. 9 and instead of being connected by glue at this point may be secured by a rivet $i$.

To lighten the structure the veneer may be cut out as shown in Fig. 11 thus leaving a frame work construction of sufficient rigidity to act as the support, and stabilizing means, for the decks of the plane. A large portion of these veneers may be cut away when the textile intermediate strip is used, which is not cut, and which serves to strengthen the frame work of the veneer.

In the above described construction sheet metal may be used as indicated in Figs. 10 to 13 inclusive thus allowing of the employment of aluminum. The metal bracing sheet may be perforated or cut away as shown in Fig. 11.

The material consisting of wood veneer with a textile sheet between the same forms a particularly light and strong material for the cover of the plane and one especially adapted to the bracing construction shown securing special rigidity and lightness, and the construction described secures a plane light and rigid and one that may be made of sheet metal.

It is to be noted that in the above construction the usual girder or rib is entirely dispensed with, the two decks with the interposed bracing material forming a girder in themselves. Because of this construction a bullet will simply make a hole through the plane or plane construction which will do no particular damage while in other constructions the bullet may break a rib or brace and disable the plane.

By placing the textile material between the wood veneer as above described the weakness due to the grained structure of the wood is obviated because the grains are bound firmly together by the interposed textile material and the cement impregnating such material and adhering to the inner surface of the veneer.

What we claim is:

1. An airplane wing made of rigid sheet material fashioned into a comparatively flat hollow body, a spacing member extending through the interior of the wing transverse to the line of flight, said spacing member comprising sheet material corrugated along lines perpendicular to the line of flight.

2. An airplane wing made of rigid sheet material fashioned into a comparatively flat hollow body, a filling piece extending through the wing transverse of the line of flight and composed of rigid sheet material corrugated so as to have straight line elements running lengthwise of the wing, and a bearing strip fitting against the inner surface of the wing and provided with a seat fitting one end of the corrugation in the filling piece.

In testimony whereof, we sign this specification.

CECIL HAMELIN TAYLOR.
BOUDEWIJN B. NEUTEBOOM.